United States Patent [19]
Boitiaux et al.

[11] Patent Number: 5,880,050
[45] Date of Patent: *Mar. 9, 1999

[54] PROCESS FOR THE REGENERATION OF CATALYST CONTAINING SULPHUR

[75] Inventors: Jean-Paul Boitiaux, Poissy; Jean De Bonneville, Rueil Malmaison; Jean-Pierre Burzynski, Sainte-Foy-Les Lyon; Gerard Leger, Caluire; Fabienne Le Peltier, Rueil Malmaison; Germain Martino, Poissy, all of France

[73] Assignee: Institut Francais du Petrole, France

[ * ] Notice: The term of this patent shall not extend beyond the expiration date of Pat. No. 5,336,829.

[21] Appl. No.: 285,550

[22] Filed: Aug. 3, 1994

Related U.S. Application Data

[63] Continuation-in-part of Ser. No. 37,117, Mar. 25, 1993, Pat. No. 5,336,829.

[30] Foreign Application Priority Data

Mar. 26, 1992 [FR] France .................................. 92/03790

[51] Int. Cl.$^6$ ...................................................... B01J 20/34
[52] U.S. Cl. ................................ 502/53; 502/37; 502/38; 502/51

[58] Field of Search ................................. 502/37, 51, 53, 502/38

[56] References Cited

U.S. PATENT DOCUMENTS

| | | |
|---|---|---|
| 3,803,052 | 4/1974 | Hayes ........................................ 208/140 |
| 4,172,027 | 10/1979 | Han et al. ............................... 208/140 |
| 4,377,495 | 3/1983 | Tse ........................................... 208/140 |
| 4,851,380 | 7/1989 | Van Leirsburg et al. ................. 502/37 |
| 5,155,074 | 10/1992 | Mohr ....................................... 208/140 |
| 5,270,272 | 12/1993 | Galperin et al. .......................... 502/37 |
| 5,336,829 | 8/1994 | Boitiaux et al. ......................... 585/659 |

*Primary Examiner*—Michael Lewis
*Assistant Examiner*—Thomas G. Dunn, Jr.
*Attorney, Agent, or Firm*—Miller, White, Zelano & Branigan, P.C.

[57] ABSTRACT

A process for the regeneration of a sulfur containing catalysts, wherein the catalyst is stripped of sulfur before the oxychlorination treatment of the regeneration process, typically before the catalyst is sent to the regeneration zone. The process is particularly useful for catalyst employed in hydrocarbon conversions such as dehydrogenation reactions, particularly those which comprise the injection of sulfur and/or at least one sulfur compound before or simultaneously to the introduction of the charge into the first reaction zone.

14 Claims, 1 Drawing Sheet

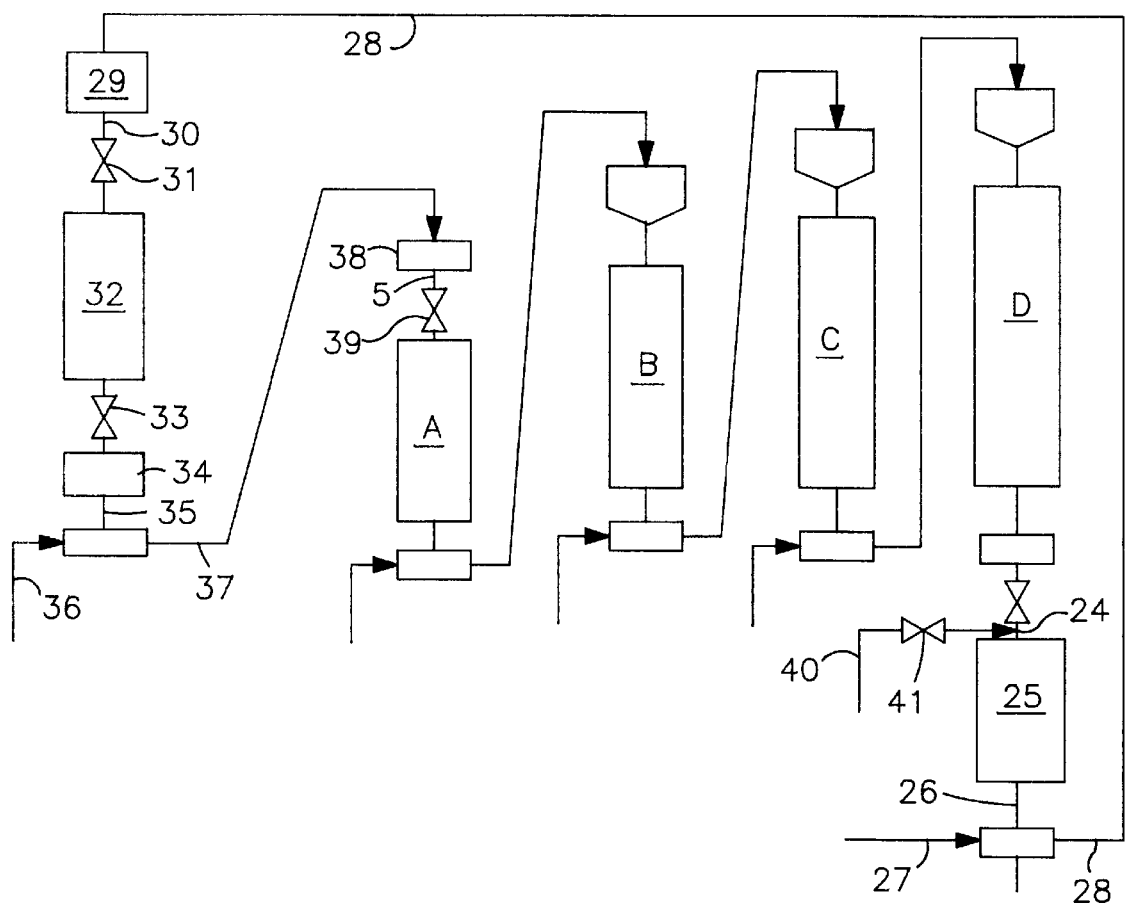

PROCESS FOR THE REGENERATION OF CATALYST CONTAINING SULPHUR

CROSS-REFERENCE TO RELATED APPLICATIONS

This application is a C-I-P application of U.S. application Ser. No. 08/037,117, filed Mar. 25, 1993, now U.S. Pat. No. 5,336,829, the contents of which are hereby incorporated by reference.

FIELD OF THE INVENTION

The invention relates to a catalyst regeneration process wherein a catalyst comprising platinum or a noble metal of the platinum family, and sulfur, at least partially deactivated, is subjected to regeneration, the improvement comprising the step of desulfurizing said catalyst by means of stripping before the oxychlorination step of the regeneration process.

SUMMARY OF THE INVENTION

The present invention concerns more particularly the regeneration of catalysts such as those used in hydrocarbon conversions including the dehydrogenation of $C_2$–$C_{20}$, preferably $C_3$–$C_5$, hydrocarbons the hydrogenation of aromatics, and reforming processes. The catalyst can be regenerated in a discontinuous, i.e., intermittent, or in a continuous system.

Sulfur is present in the deactivated catalyst for several possible reasons:

1. The sulfur is intentionally introduced into the charge in the case of the dehydrogenation of $C_2$–$C_{20}$ hydrocarbons, preferably $C_3$–$C_5$ hydrocarbons.
2. The sulfur is initially present in the charge (as an impurity for example).
3. The sulfur is unintentionally introduced into the charge or into the hydrogen feed or into any active component (accident for example).
4. The sulfur is intentionally introduced into the catalyst.

The sulfur content of the deactivated catalyst is generally from 900 ppm to 1% by weight, preferably from 900 ppm to 5000 ppm (that is to say 0.5% by weight).

In most catalytic reactions, the catalyst is deactivated mainly by coke formation.

The stripping step is carried out in a stripping zone by injecting a stripping fluid which consists essentially of hydrogen. The stripping conditions are linked to the nature of the catalytic reaction which is carried out and which has resulted in the deactivation of the catalyst. For example, in the case of the dehydrogenation of isobutane, the temperature is typically between 300° and 700° C., preferably between 500° and 600° C., the pressure is typically between 1.0 and 4.0 bar, preferably between 1.5 and 2.5 bar, and the VVH is typically between 100 and 4,000 $h^{-1}$, preferably between 700 and 2,500 $h^{-1}$. However, in general, the temperature is typically between 300° and 700° C., the pressure is typically between 1.0 and 15.0 bar and the VVH is typically between 100 and 10,000 $h^{-1}$.

The stripping step is carried out under a flow of hydrogen. The stripping fluid can preferably be recycle hydrogen which may be purified of sulfur from the charge or from the catalyst if the latter has been presulfurized. The stripping operation can be carried out continuously or intermittently.

At the end of the stripping step, the sulfur content of the catalyst is below 300 ppm, preferably below 200 ppm.

The other treatments of the regeneration process which typically follow this step of stripping, particularly in the case of a catalyst supported on alumina, are the following:

A first treatment which corresponds to a treatment at a high temperature in the presence of oxygen typically for the combustion of coke deposits. This operation is typically carried out by injecting air into an inert mixture composed, for example, of nitrogen and carbon dioxide. This inert mixture acts as a thermal diluent. The oxygen content in the regeneration gas injected at the top of the regenerator is preferably between 0.01 and 2% by volume. The injected air is consumed by combustion of the coke deposits, and the end of the combustion process is easily detected by the increase in oxygen content in the gas issuing from the regenerator and also by the disappearance of the front of the flame (horizontal plane where the combustion is produced) which is propelled from the top to the bottom of the catalytic bed. Combustion is carried out at an average temperature which is preferably between 300° and 700° C. and at a pressure of between 1 and 15 bar, the oxygen content of the gas being between 0.01 to 22% by volume.

A second treatment corresponds to oxychlorination of the catalyst. The oxygen content is most frequently between 1 and 22% by volume during this oxychlorination step. During this step, a halogen and/or a halogenated compound is introduced simultaneously. Chlorine and/or a compound with chlorine is/are preferably used. An alkyl halogenide is preferably used which contains 1 to 6 carbon atoms per molecule, preferably carbon trichloroethane or carbon tetrachloride. The proportion of halogen or halogenated compound used is such that it can be capable of forming 0.2 to 5.0% by weight of a halogenated derivative in relation to the catalyst undergoing regeneration. Oxychlorination is carried out at a temperature of between 300° and 700° C. and at a pressure of between 1 and 15 bar. Possibly there is from 50 ppm to 2% by volume of water in the gas.

An optional third treatment corresponds to oxidation of the catalyst. The oxygen content is thus most frequently between 3 and 20% by volume, the average temperature being between 300° and 700° C. and the pressure being between 1 and 15 bar. This operation lasts between 30 minutes and two hours, for example. It usually lasts one hour.

These three treatments are usually carried out either successively in one single chamber with a fixed bed, for example, or in a chamber with a moving bed, the catalyst passing through three separate zones in succession where each of the regeneration steps are carried out. These treatments can also be carried out successively in a plurality of separate chambers.

The catalyst is then transferred from the regenerator to the first catalytic zone, through a system of valves. At the top of this catalytic zone, the catalyst is first of all collected in a space separate from the reaction zone (that is to say where no reaction mixture containing hydrocarbons passes) where it is reduced by a hydrogen flow at a temperature of between 350° and 600° C. and at a pressure of between 2 and 25 bar, preferably between 4 and 15 bar. The catalyst may be presulphurized in this space. The fresh (and reduced) catalyst gradually supplies the selected reaction zone as the spent catalyst is drawn off.

The invention also concerns a regeneration process wherein the first treatment herein above disclosed is carried out before the stripping step, then the stripping step is carried out and after the stripping step the oxychlorination treatment is carried out, possibly followed by a treatment of oxidation of the catalyst.

Embodiments of the process of the present invention include, for example, methods for treating catalysts used with sulfur injected into the charge. Such embodiments can include means for injecting sulfur into the charge and means for stripping the sulfur which is retained on the catalyst; these conditions make it possible for the stability of the catalyst to be improved and also its life.

Some intermediate treatments such as unloading of the catalyst and oxidation of the catalyst may also be carried out between the steps of regeneration according to the invention.

The catalyst treated by the process of the present invention can be any conventional catalyst comprising at least one noble metal of the platinum family, well-known to those skilled in the art. The catalyst is preferably a supported catalyst, wherein the support is selected from the group formed by refractory oxides, and in a preferred manner the support comprises alumina and possibly at least one other oxide such as titanium oxide or silica.

The specific surface area of the support is most frequently between 20 and 800 square meters per gram ($m^2/g$) and preferably between 50 and 500 $m^2/g$. The catalyst most frequently contains, by weight in relation to the support, 0.01 to 2% of at least one noble group VIII metal. The catalyst can also contain at least a halogen or a halogenated compound such as chlorine, fluorine, for example, or a chlorine or a fluorine compound. It can also contain sulfur or any other catalytic metal known to one skilled in the art.

The dehydrogenation reaction, which is the dehydrogenation of $C_2$–$C_{20}$ hydrocarbons, preferably $C_3$–$C_5$ hydrocarbons, is usually carried out at a pressure of between 0.2 and 20 bar absolute (1 bar=0.1 mPa) and at a temperature of 400° to 800° C. depending on the type of charge, the temperature advantageously being between 540° and 700° C. for a cut containing mainly propane, between 500° and 650° C. for a cut containing mainly isobutane and between 400° and 550° C. for a cut containing mainly isopentane, at a pressure which is preferably between 1 and 4 bar absolute. The volumetric spatial velocity (relative to the liquid charge) recommended is usually between 0.5 and 150 $h^{-1}$ and preferably for a cut containing mainly propane or a cut containing mainly isobutane between 1.5 and 6 $h^{-1}$. When the charge comprises hydrogen, its recycling rate is between 0 and 15 moles of hydrogen per mole of feed. The charge can be pre-mixed, or not, with a diluent selected, for example, from the group formed by hydrogen, water vapor and methane. Sulfur can be injected into the charge in the form of elemental sulfur and/or in the form of at least one compound of sulfur.

The organic sulfur compounds which are usually injected are selected from the group formed of organic disulfides and polysulfides, preferably those of the formulae R'-$(S)_n$-$R^2$ wherein $R^1$ and $R^2$, which can be the same or different, each represent a hydrogen atom or a hydrocarbon radical and n is a number between 2 and 20 (inclusive) and preferably between 2 and 8 (inclusive). Examples of hydrocarbon radicals are saturated or unsaturated linear or branched aliphatic radicals, cycloaliphatic radicals and aryl radicals. In the above formula, $R^1$ and $R^2$ which are identical or different may represent independently of one another a hydrogen atom, a linear or branched alkyl radical, an aryl radical, an arylalkyl radical or a cycloalkyl radical. It is advantageous to use polysulfides of the above formula, wherein at least one of the $R^1$ and $R^2$ radicals represents a hydrocarbon radical, and preferably those wherein $R^1$ and $R^2$, which are the same or different, each represent a hydrocarbon radical such as a linear or branched alkyl radical or an aryl radical, for example. Organic polysulfides which are particularly preferred are those wherein $R^1$ and $R^2$, which are the same or different, each represent a hydrocarbon radical such as a linear or branched alkyl radical or an aryl radical, for example. Organic polysulfides which are particularly preferred are those wherein $R^1$ and $R^2$, which may be the same or different, each represent an alkyl radical; they will be called dialkylpolysulfides hereinafter.

Examples of organic polysulfides can be cited as organic disulfides and more particularly dialkyldisulfides. The organic polysulfides used usually have from 2 to 72 carbon atoms, preferably 2 to 48 carbon atoms in their molecule. The dialkylpolysulfides which can be used advantageously have from 2 to 24 carbon atoms in their molecule and the organic polysulfides of the formula hereinabove wherein $R^1$ and $R^2$ represent an aryl, aralkyl or cycloalkyl radical advantageously have 6 to 48 carbon atoms, and preferably 10 to 32 carbon atoms in their molecule.

As examples of organic polysulfide specific compounds, it is possible to cite dimethylsulfide (DMDS), diethyldisulfide (DEDS), dipropyidisulfides, dibutyldisulfides and, in particular, ditertiobutyldisulfide (DTDBS), diphenyldisulfide (DPDS), ditertiododecylpolysulfide (n=5) marketed by ELF AQUITAINE, for example, under the name TPS 32, in particular because it contains about 32% by weight of sulfur, and ditertiononylpolysulfide (n =5) marketed by ELF AQUITAINE, for example, under the name TPS 37.

The amount of polysulfide which can be used and expressed by weight of sulfur in relation to the charge is usually from 1 to 1000 ppm, and most frequently from 1 to 200 ppm. This amount is preferably about 5 to 100 ppm.

The catalytic reforming process and the aromatics production process are usually carried out at a pressure of between 0.1 and 3.5 MPa and at a temperature between 400° and 600° C., with a liquid hourly space velocity typically between 0.1 and 10 volumes of liquid feed per catalyst volume. The ratio of hydrogen per mole of feed is typically between 1 and 20. The conditions for the catalytic reforming reactions are more particularly the following: an average temperature between 480° and 580° C., a total pressure between 0.2 and 1.8 MPa and more preferably between 0.3 and 3 MPa, the hourly space velocity included between 1 and 10 volumes of liquid feed per catalyst volume and a recycle ratio between 1 and 6 hydrogen moles per feed mole. If the feed is unsaturated, that is to say that the feed comprises olefins, these very olefins will have been eliminated previously by complete hydrogenation. The feed is generally a naphtha issued from direct distillation, pyrolysis gasoline from cracking and more particularly from steam reforming.

The hydrogenation process for aromatics is carried out at a pressure typically between 1 and 30 MPa, a temperature between 150° and 450° C., an hourly space velocity between 0.2 and 10 $h^{-1}$ volumes of liquid feed per catalyst volume. More preferably, the operating conditions are the following: the pressure is between 2 and 25 MPa, the temperature is between 180° and 400° C., and the hourly space velocity is between 0.3 and 8 $h^{-1}$ volumes of liquid feed per catalyst volume. The operating conditions are related to the nature of the feed. All the feeds with a molecular weight higher than the naphtha molecular weight could be hydrogenated using this kind of catalyst. The feed usually comprises a compound with a number of carbon atoms per molecule between 10 and 60 inclusive and more preferably between 11 and 50 inclusive. Before the catalytic hydrogenation, the heteroatoms such as sulfur and nitrogen are at least partially eliminated. The residual sulfur content is less than 5000 ppm, and more preferably less than 4500 ppm. The nitrogen content is less than 1000 ppm and more preferably less than 800 ppm. For example, the feed could be chosen from within kerosenes, gas-oils, distillates hydrotreated under vacuum, and base oils.

BRIEF DESCRIPTION OF THE FIGURE

Various other objects, features and attendant advantages of the present invention will be more fully appreciated as the same becomes better understood when considered in conjunction with the accompanying drawing which is a schematic flowsheet of a dehydrogenation process which incorporates and thus illustrates an embodiment of this invention, but without limiting the scope thereof. In the FIGURE, the reaction zones are substantially vertical and the catalyst circulates from the top to the bottom in each of these zones, and is conveyed by a hydrogen current from the bottom of a given zone (with the exception of the last zone) to the top of the following zone.

In the FIGURE, for the sake of simplicity, the path of the charge circulating successively through the reactors in series (A, B, C and D) has not been illustrated in detail.

DETAILED DESCRIPTION OF THE FIGURE

The charge enters at the top of the reactor (A) and leaves it at the bottom to be reintroduced at the top of the reactor (B), and so on and so forth in the reactors (C) and (D).

The spent catalyst which is drawn off from the bottom of the reactor (D) is directed towards the regeneration zone (32). Passage from an atmosphere of hydrogen to an atmosphere of nitrogen is directly upstream of the regenerator at the level of the "accumulator decanter" round-bottomed flask (29), and return to an atmosphere of hydrogen is directly downstream of the regenerator at the level of the accumulator round-bottom flask (34), and sealing is provided by valves (31) and (33) (in reality, there are frequently many more valves (31) and (33)), while in a second variant nitrogen/hydrogen transition takes place directly upstream of the first reactor at the level of the round bottomed flask (38) and sealing is provided by valves (31) and (39). The spent catalyst is sent via the conduit (24) into the stripping zone (25) where it undergoes stripping with heat by means of one of the stripping gases described hereinabove (hot hydrogen, for example) to remove therefrom part of the sulfur which has accumulated in the reaction zones. The catalyst from which sulfur has been removed and which has been drawn off through the conduit (26) is then ascended by a lift (28), using as the motive fluid recycled hydrogen which is introduced partly through the conduit (40) and the valve (41) and partly through the conduit (27) to the "accumulator decanter" round-bottomed flask (29).

In this round-bottomed flask (29), the motive fluid, after having been separated from the catalyst, is sent through a conduit, not shown, to a recycle compressor through a system for filtering the fine catalyst particles. The spent catalyst is then conveyed via the conduit (30) to the regenerator (32) under equalized pressure in an atmosphere of the motive gas used (most frequently hydrogen) with the "accumulator decanter" round-bottomed flask (29). The regenerator is then isolated from the rest of the system by closing the valves (31) and (33), purging with nitrogen, if necessary (that is to say when the motive gas is not nitrogen), and the regeneration, consisting of the three treatments described hereinabove, is conducted in one single chamber with fixed bed or in a chamber with a moving bed. When the regeneration is carried out, the regenerator (32) is purged with nitrogen, if necessary, and is then either placed in an atmosphere of hydrogen in pressure equilibrium with the reactor (A), or is kept in an atmosphere of nitrogen. The regenerated catalyst is conveyed to a round-bottomed buffer flask (34), through the conduit (35) and a lift (37) operated by way of a motive gas introduced through the line (36) which is either hydrogen or nitrogen, depending on the case, into a collector for the catalyst (38) in which reduction and sulfurization of the catalyst can take place. The regenerated catalyst, which is optionally reduced and sulfurized is then gradually introduced into the reactor (A) through the line (5) and valve (39) and the catalyst passes to reactors (B, (C) and (D).

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding application French Appln. No. 92/03790, filed Mar. 26, 1992, are hereby incorporated by reference.

EXAMPLES

Example 1

The catalysts regenerated by the procedure according to the invention are subjected to different steps which are desulfurization, combustion of coke, oxychlorination and a final calcination step.

The operating conditions of the desulfurization are: the desulfurization step is carried out in a quartz tubular reactor, at atmospheric pressure, at a gaseous hourly volumetric space velocity of hydrogen (GHSV) of $900^{h-1}$ and at a temperature of 580° C. The hydrogen flow is maintained as long as the catalyst comprises 150 ppm of sulfur.

The operating conditions of the combustion step are: the combustion is carried out in the same reactor described hereinabove. The combustion temperature of 450° C.±5° is maintained until the coke is reduced to less than 0.1 wt. % of the catalyst.

The pressure in the regenerator is kept at about 3.2 bar, the oxygen content of the gaseous mixture (nitrogen plus air) introduced is kept at about 0.5% by volume.

The operating conditions of the oxychlorination test are: the oxychlorination is performed during 2 hours at a temperature of 500° C., and trichloroethane ($C_2H_3Cl_3$) is injected in order to introduce a content of 1 wt. % of chlorine on the catalyst. The oxygen content of the oxychlorination gas is 20% by volume and the oxychlorination gas comprises 1200 ppm $H_2O$.

The operating conditions of the calcination test are: the temperature is 510° C., the reaction time is one hour and the oxygen content of the calcination step is 20% by volume.

The comparative regeneration procedure is the same as described above but without the first step of desulfurization.

Example 2

A catalyst TO comprising 0.6 wt. % platinum, 0.45 wt. % tin, 1.5 wt. % chlorine and 1 wt. % potassium is employed.

Three tests of dehydrogenation using fresh catalyst TO are carried out for a total duration of approximately 270 hours, in between which two regeneration steps take place. Each regeneration step comprises a first step of desulfurization, a second step of combustion and a third step of oxychlorination. The thus obtained catalyst is called catalyst T. The operating conditions of the dehydrogenation tests are given hereinafter: the hydrocarbon charge which is treated has the composition given in Table I.

TABLE 1

| Charge | % By Weight |
|---|---|
| Propylene | 0.09 |
| Propane | 1.24 |
| Isobutane | 92.57 |
| Isobutene | 0.02 |
| n-butane | 6.00 |
| n-butenes | 0.05 |
| $C_5^+$ | 0.03 |

Added beforehand to the charge (that is to say prior to its introduction to the dehydrogenation zone which comprises four reactors in series) is a sufficient amount of DMDS to produce a charge containing 50 ppm by weight of sulfur. In each of the reactors, the temperature at the intake is 590° C. and the volumetric space velocity is 2 volumes of the liquid charge (at 15° C.) per volume of catalyst and per hour. The recycle rate of the hydrogen is 1 mole of hydrogen per mole of charge. The pressure at the intake to the first reactor 3.2 bar. These reactors are of the "radial" kind, such as those described in U.S. Pat. No. 4,277,444.

The catalyst is distributed in the reactors in the following proportions:

Reactor 1: 22%

Reactor 2: 24%

Reactor 3: 26% and

Reactor 4: 28%.

The total amount of catalyst is 22.350 kg. The catalyst is replenished at a rate of 150 kg/h. The flow rate of $H_2$ in the lifts is 15 kg/h.

The used catalyst comprises 720 ppm by weight of sulfur and 22% by weight of carbon. One sample of the used catalyst, designated catalyst A, is then regenerated after the step of desulfurization according to the invention (that is to say that the catalyst is subjected to desulfurization+ combustion+oxychlorination+calcination) and another sample of the used catalyst designated catalyst B, is regenerated in a classical way (combustion+oxychlorination+ calcination).

The catalysts TO, A and B were tested for the dehydrogenation of a pure isobutane feed (99.9 wt. % of isobutane and 0.1 wt. % of n-butane) in a tubular quartz isothermal reactor and in a continuous flow under atmospheric pressure. The catalyst sample (3.5 g) is reduced under 20 liters per hour of hydrogen at 530° C. for 2 hours. Then, the isobutane feed at a rate of 20 liters per hour is injected, corresponding to one mole of hydrogen per mole hydrocarbon feed, and at a weight hourly space velocity of $14^{h-1}$. The temperature is increased from 530° to 560° and 580° C. The product analysis is performed in line by gas chromatography.

The data concerning fresh catalyst TO and catalysts A and B after regeneration is given herein in Table 2:

TABLE 2

DEHYDROGENATION OF ISOBUTANE

|  | Yield (% weight) at | | Selectivity (% weight) at | |
|---|---|---|---|---|
|  | 560° C. | 580° C. | 560° C. | 580° C. |
| Catalyst TO (fresh catalyst) | 36.3 | 43.2 | 90.1 | 89.8 |
| Catalyst A (according to the invention) | 37.1 | 41.4 | 91.5 | 90.9 |
| Catalyst B (comparative) | 32.5 | 36.9 | 92.6 | 92.0 |

The data shows that the regeneration according to the invention allows the obtention of a catalyst whose properties are nearly the same as those of the fresh catalyst. The yields obtained by catalyst B are clearly lower than those of the fresh catalyst TO and those of the catalyst A regenerated according to the invention.

Example 3

A catalyst comprising 0.6% Pt, 2% Cl and alumina— (synthesized according to U.S. Pat. No. 4,225,461) is used for the hydrogenation of aromatic molecules contained in a gas-oil from a catalytic cracking unit (LCO). The feed is hydrogenated after being desulfurized using the HR 306 C catalyst marketed by the company PROCATALYSE.

A deactivation, that means a loss of activity, is observed with time. When the minimum acceptable activity is reached, the catalyst must be regenerated. For these platinum-based catalysts, a simple coke combustion is not sufficient and an oxychlorination step is necessary.

The results obtained by hydrogenation using the fresh catalyst (catalyst A), the catalyst regenerated conventionally without previously sulfur elimination (catalyst B) and the catalyst regenerated according to the invention (catalyst C) are reported in Table 3.

TABLE 3

|  | Feed | Catalyst A | Catalyst B | Catalyst C |
|---|---|---|---|---|
| Specific gravity | 0,896 | 0,8752 | 0,8806 | 0,8574 |
| S (wt %) | 18 | 3 | 6,7 | 3 |
| N (wt ppm) | 5 | <0,5 | 1,2 | <0,5 |
| Distillation in wt % (ASTM D2887) | | | | |
| Initial Boiling Point (IBP) | 177 | 170 | 172 | 165 |
| 10% | 225 | 222 | 224 | 221 |
| 50% | 263 | 254 | 257 | 253 |
| 90% | 316 | 306 | 311 | 304 |
| Final Boiling Point (FBP) | 359 | 348 | 356 | 345 |
| Aromatics by Mass Spectrography (wt %) | | | | |
| total | 69 | 49,7 | 56,7 | 50,1 |
| mono. | 48 | 40,2 | 45,6 | 40,4 |
| di. | 19 | 9,5 | 10,7 | 9,7 |
| tri. | 2 | 0 | 0,4 | 0 |

The data shows that the regeneration according to the invention C allows the obtention of a catalyst whose performances are nearly the same as the ones of the fresh catalyst A. The hydrogenating activities of catalyst B are clearly lower than those of the fresh catalyst A and those of the catalyst C regenerated according to the invention.

Example 4

A catalyst comprising 0.6% Pt and a silica-alumina— (commercial name Siralex 30—manufactured by Condea) is used to hydrogenate aromatic compounds present in a feed in order to obtain white oils.

A deactivation, that means a loss of activity, is observed with time. When the fixed minimum is reached, the catalyst must be regenerated. For these platinum based catalysts, a simple coke combustion is not sufficient and an oxychlorination step is necessary.

The performances of the fresh catalyst (catalyst A), of the catalyst regenerated conventionally without previous sulfur elimination (catalyst B) and of the catalyst regenerated according to the invention (catalyst C) are reported in the Table 4.

TABLE 4

|  | Feed | Catalyst A | Catalyst B | Catalyst C |
|---|---|---|---|---|
| Specific gravity | 0,894 | 0,8782 | 0,881 | 0,8788 |
| viscosity at 40° C. (cSt) | 119 | 98 | 102,5 | 98,4 |
| viscosity at 100° C. (cSt) | 12,5 | 11,2 | 11,5 | 11,3 |
| S (wt %) | 1,00 | 0,0020 | 0,0185 | 0,0023 |
| N (wt ppm) | 132 | 0,6 | 1,5 | 0.8 |
| Distillation in wt % (ASTM D2887) | | | | |
| Initial Boiling Point (IBP) | 375 | 360 | 368 | 362 |
| 10% | 455 | 433 | 442 | 431 |
| 50% | 506 | 451 | 461 | 452 |
| 90% | 557 | 504 | 513 | 506 |
| Final Boiling Point (FBP) | 606 | 580 | 592 | 578 |
| Absorbance (ASTM D2008) | | | | |
| 260–280 | 2,97 | 0,193 | 0,319 | 0,195 |
| 280–289 | 1,73 | 0,176 | 0,289 | 0,180 |
| 290–300 | 1,26 | 0,080 | 0,115 | 0,079 |
| 300–329 | 0,94 | 0,053 | 0,070 | 0,054 |
| 330–350 | 0,27 | 0,021 | 0,025 | 0,022 |
| 350–359 | 0,94 | 0,053 | 0,070 | 0,055 |
| 360–400 | 0,05 | 0,017 | 0,009 | 0,019 |

This data shows that the regeneration according to the invention C allows the obtention of a catalyst whose performances are nearly the same as those of the fresh catalyst A. The catalytic performances of the catalyst B are clearly lower than those of the fresh catalyst A and those of the catalyst C regenerated according to the invention as seen particularly from the absorbance UV data.

Example 5

A catalyst comprising 0.6% Pt and a silica-alumina—(commercial name Siralex 30—manufactured by Condea) is used to hydrogenate aromatic compounds present in a gatsch 5 (a crude paraffin from a dewaxing step) in order to obtain base oils.

A deactivation, that means a loss of activity, is observed with time. When the fixed minimum is reached, the catalyst must be regenerated. For these platinum based catalysts, a simple coke combustion is not sufficient and an oxychlorination step is necessary.

The performances of the fresh catalyst (catalyst A), of the catalyst regenerated by the classical way without previous sulfur elimination (catalyst B) and of the catalyst regenerated according to the invention (catalyst C) are reported in the Table 5.

TABLE 5

|  | Feed | Catalyst A | Catalyst B | Catalyst C |
|---|---|---|---|---|
| Specific gravity | 0,880 | 0,852 | 862 | 0,853 |
| S (wt %) | 7500 | 5 | 35 | 6 |
| N (wt ppm) | 220 | 3 | 19 | 2 |
| Distillation in wt % (ASTM D2887) | | | | |
| Initial Boiling Point (IBP) | 450 | 372 | 420 | 363 |
| 10% | 500 | 454 | 470 | 450 |
| 50% | 550 | 532 | 538 | 529 |
| 90% | 580 | 561 | 568 | 559 |
| Final Boiling Point (FBP) | 650 | 638 | 654 | 629 |
| Carbon by NMR | | | | |
| Aromatic carbon | 4,4 | 0 | 1,7 | 0 |
| Paraffinic carbon | 13 | 8 | 9,3 | 8,5 |
| Naphtenic carbon | 83 | 92 | 89 | 91,5 |

The data shows that the regeneration according to the invention of the catalyst C allows the obtention of a catalyst whose performances are nearly the same as those of the fresh catalyst A. The catalytic performances of the catalyst B are clearly lower than those of the fresh catalyst A and those of the catalyst C regenerated according to the invention, as can be seen particularly from the NMR data of the different carbon atom species.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for regenerating an at least partially deactivated catalyst comprising sulfur and a noble metal of the platinum family, wherein the process for regenerating an at least partially deactivated catalyst comprises a treatment for the removal of coke deposits and an oxychlorination treatment, the improvement comprising:

subjecting said at least partially deactivated catalyst to a treatment for the removal of sulfur prior to the oxychlorination treatment, said treatment for the removal of sulfur comprising exposing said at least partially deactivated catalyst to a stripping fluid of hydrogen which is free of chlorinated hydrocarbons and HCl, at a temperature between 580° C. and 700° C.

2. A process as in claim 1, wherein at least 67% of the sulfur within the partially deactivated catalyst is removed by said treatment for the removal of sulfur.

3. A process as in claim 1, wherein the treatment for the removal of coke deposits comprises combustion with oxygen at 0.01–2% by volume at temperatures in the range of 300°–700° C. in the absence of HCl.

4. A process as in claim 1, carried out continuously.

5. A process as in claim 1, wherein the treatment for the removal of sulfur is performed after the treatment for the removal of coke deposits.

6. A process as in claim 1, wherein the sulfur content of the catalyst is reduced to below 300 ppm following the treatment for the removal of sulfur.

7. A process as in claim 1, wherein the oxychlorination treatment comprises exposing the catalyst to an oxygen-containing stream containing oxygen at 1–22% by volume and a halogen or halogenated compound in an amount sufficient to provide 0.2–5.0% by weight of a halogen derivative based on the catalytic mass, at a temperature of 300°–700° C. and pressure of 1–15 bar.

8. A process as in claim 1, wherein the catalyst is oxidized by exposure to oxygen at 3–20% by volume at a temperature of 300°–700° C. for 0.5 to 2 hours.

9. A process as in claim 1, wherein said noble metal is platinum free of tin.

10. A process as in claim 1, wherein the sulfur content of the catalyst is reduced to below 200 ppm following the treatment for the removal of sulfur.

11. A process for regenerating an at least a partially deactivated catalyst which contains sulfur and comprises a noble metal of the platinum family, wherein said process comprises:
   a) subjecting said at least partially deactivated catalyst to a stripping fluid of hydrogen, which is free of HCl and chlorinated hydrocarbons, to remove sulfur at a temperature between 580° C. and 700° C., followed by
   b) removing coke deposits on said at least partially deactivated catalyst by combustion and exposing said at least partially deactivated catalyst to an oxychlorination treatment.

12. In a process for regenerating an at least partially deactivated catalyst comprising sulfur and a noble metal of the platinum family, wherein:
   a) the process for regenerating an at least partially deactivated catalyst comprises a treatment for the removal of coke deposits and an oxychlorination treatment, and
   b) the oxychlorination treatment comprises exposing the catalyst to an oxygen-containing stream containing oxygen at 1–22% by volume and a halogen or a halogenated compound other than HCl,
   the improvement comprising subjecting said at least partially deactivated catalyst to a treatment for the removal of sulfur prior to the oxychlorination treatment, said treatment for the removal of sulfur comprising exposing said at least partially deactivated catalyst to a stripping fluid of hydrogen, which is free of HCl and chlorinated hydrocarbons, at a temperature between 580° C. and 700° C.

13. In a process for regenerating an at least partially deactivated catalyst comprising sulfur and a noble metal of the platinum family, wherein:
   a) the process for regenerating an at least partially deactivated catalyst comprises a treatment for the removal of coke deposits and an oxychlorination treatment, and
   b) the oxychlorination treatment comprises exposing the catalyst to an oxygen-containing stream containing oxygen at 1–22% by volume and an alkyl halogenide which contains 1–6 carbon atoms per molecule,
   the improvement comprising subjecting said at least partially deactivated catalyst to a treatment for the removal of sulfur prior to the oxychlorination treatment and treatment for the removal of coke deposits wherein the treatment for the removal of sulfur from the catalyst comprises exposing the catalyst to a stripping fluid of hydrogen, which is free of HCl and chlorinated hydrocarbons, at a temperature between 580° C. and 700° C.

14. In a process for regenerating an at least partially deactivated catalyst comprising sulfur and a noble metal of the platinum family, wherein:
   a) the process for regenerating an at least partially deactivated catalyst comprises a treatment for the removal of coke deposits and an oxychlorination treatment; and
   b) the oxychlorination treatment comprises exposing the catalyst to an oxygen containing stream containing oxygen at 1–22% by volume and a halogen or halogenated compound other than HCl;
   the improvement comprising
   i) subjecting said at least partially deactivated catalyst to a treatment for the removal of sulfur prior to the oxychlorination treatment and
   ii) introducing halogen to the deactivated catalyst only in the oxychlorination treatment and not in the treatment for the removal of coke deposits or in the treatment for the removal of sulfur, said treatment for the removal of sulfur comprising exposing said at least partially deactivated catalyst to a stripping fluid of hydrogen, which is free of HCl and chlorinated hydrocarbons, at a temperature between 580° C. and 700° C.

* * * * *